Nov. 30, 1943.   E. J. DILLMAN   2,335,824
VALVE
Filed June 10, 1940
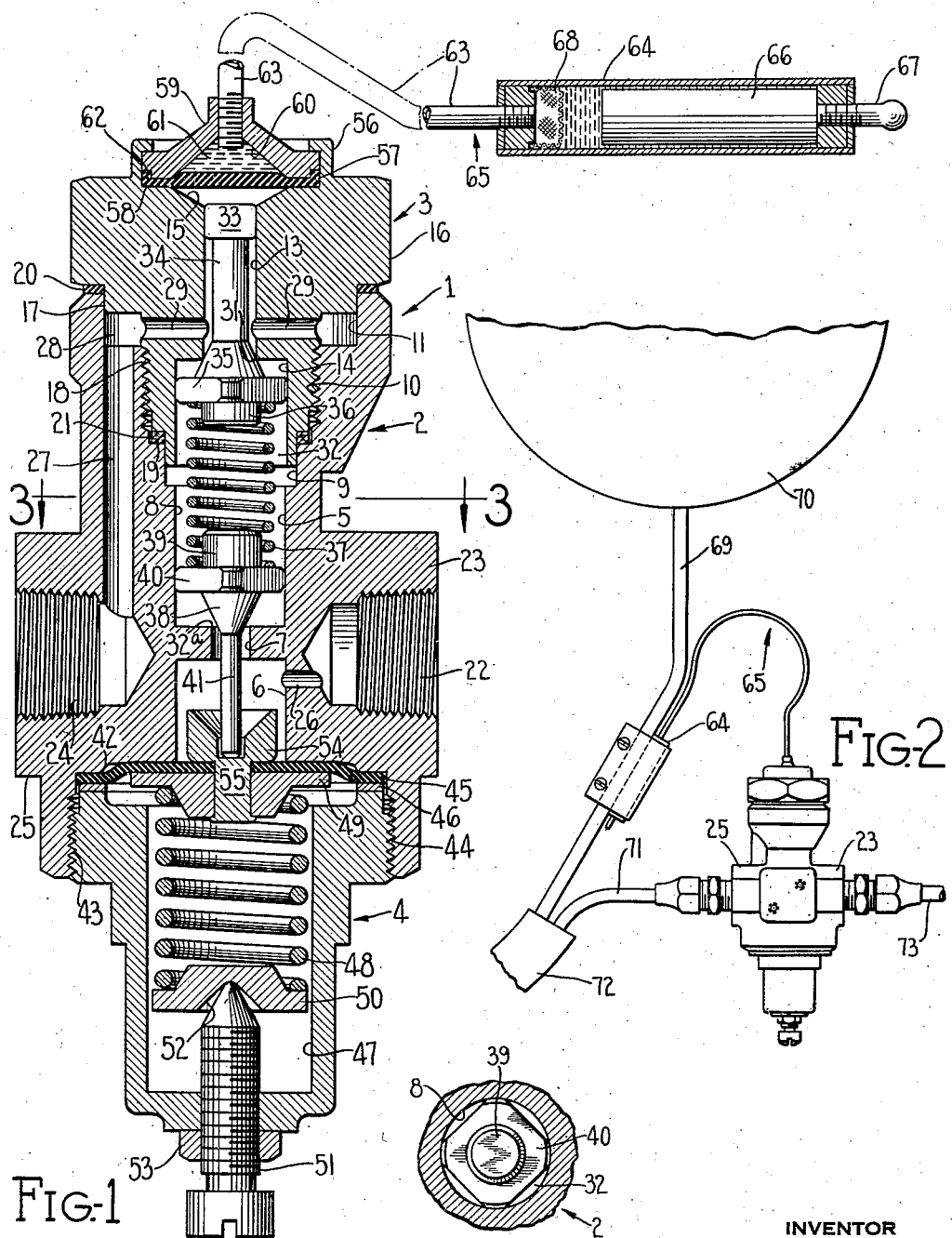
INVENTOR
Earnest J. Dillman
BY
Andrew K. Foulds
his attorney Patented Nov. 30, 1943

2,335,824

UNITED STATES PATENT OFFICE 2,335,824

VALVE

Earnest J. Dillman, Detroit, Mich., assignor to Detroit Lubricator Company, Detroit, Mich., a corporation of Michigan Application June 10, 1940, Serial No. 339,610

8 Claims. (Cl. 236—92)

This invention relates generally to valves and more particularly to a valve for controlling the flow of a cooling medium in a refrigerating system.

An object of this invention is to provide a flow controlling means for allowing flow of a cooling medium upon occurrence of a predetermined high temperature of the refrigerant discharged from the compressor.

Another object is to provide a power means having a rapid response to temperature change at the desired predetermined high temperature for controlling the flow controlling means.

Another object is to provide a means for maintaining the flow of water constant irrespective of fluctuation of supply pressure.

Another object is to provide a means for regulating the flow of water in response to outlet pressure thereby to maintain the flow of water constant.

Another object is to provide a single valve structure to accomplish the regulation of the flow according to the predetermined high temperature and also to maintain the flow of the cooling medium constant.

The invention consists in the improved construction and combination of parts, to be more fully described hereinafter and the novelty of which will be particularly pointed out and distinctly claimed.

In the accompanying drawing, to be taken as a part of this specification, a preferred embodiment of this invention is fully and clearly illustrated, in which drawing:

Figure 1 is a view in central vertical section of the valve means;

Fig. 2 is a partial schematic view of a refrigerating system showing the valve means installed therein, and Fig. 3 is a partial view substantially along the line 3—3 of Fig. 1 looking in the direction of the arrows and with the spring removed.

Referring to the drawing by characters of reference, the numeral 1 designates generally a valve means comprising a body member 2 and upper and lower cap members 3 and 4, respectively. The body member 2 has a longitudinal central bore 5 comprising a plurality of bore portions 6, 7, 8, 9, 10 and 11. The portion 7 is of the smallest diameter and is interposed between portions 6 and 8 which are of approximately equal diameter and portions 9, 10 and 11 have progressively larger diameters. The cap member 3 has a longitudinal central bore 13 which is concentric with bore 5. The bore 13 has, at its lower end portion, an enlarged portion 14 which is of substantially the same diameter as the bore portions 6 and 8 and has at its upper end an outwardly tapered portion 15. The cap member 3 comprises a polygonal portion 16, a portion 17 of circular cross-section and of a diameter substantially that of the bore portion 11, a portion 18 of circular cross-section and of a diameter somewhat larger than that of the bore portion 10, and a portion 19 which has a diameter substantially equal to that of the bore portion 9. The portion 18 is externally threaded and the bore portion 10 is internally threaded so that the cap member 3 may be screw-threadedly secured to the body member 2. Packing material 20 is placed intermediate a shoulder formed by the intersection of portions 16 and 17 and the upper end wall of member 2, adjacent the bore portion 11. Packing material 21 is placed intermediate a shoulder formed on the cap member 3 by the intersection of portions 18 and 19 and bore portions 8 and 9. The packing material 20 and 21 is compressed as the cap member 3 is screw-threaded to the body member 2 to form fluid-tight seals.

The body member 2 has an internally threaded outlet port 22 within a boss 23 and an internally threaded inlet port 24 within a boss 25. The outlet port 22 is communicatively connected to the interior of the bore portion 6 by means of a flow restricting orifice 26. The inlet port 24 is connected by means of a passageway 27 to an annular recess 28 formed by the bore portion 11 of body member 2 and portion 18 of the cap member 3. A plurality of radially extending passageways 29 connect the annular recess 28 to the central bore 13 of cap member 3. The opening of the normal diameter portion of the bore 13 into the enlarged portion 14 forms a valve or inlet port 31 leading into a chamber 32 formed by the bore portions 8, 9 and 14. An outlet valve port 32ª of the chamber 32 is formed by the opening of the bore portion 7 into the bore portion 8.

Positioned within the chamber 32 and having a stem portion 33 extending into and guided by the bore 13 is a valve member 34 having a conical seating surface which cooperates with the inlet port 31 to control flow of fluid into the chamber 32. The stem portion 33 has a reduced diameter portion which cooperates with the wall of bore 13 to form a flow passageway from the radially extending passageways 29 to the chamber 32. The valve member 34 is guided within the chamber 32 by the sliding fit of a rectangular valve member portion 35 having its corners rounded to give additional bearing surface and having its side edge portions, which form chords with the walls of chamber 32, cooperating to form flow passageways for the flow of fluid past the valve member 34. The valve member 34 has a projecting portion 36, circular in cross-section, which forms a guide about which is positioned one end of a helical coil compression spring 37. The spring 37 extends longitudinally of the chamber 32 and has its lower end portion abutting a valve member 38. The valve member 38 is similar to the valve member 34 in that it has a guide or projecting portion 39, a rectangular portion 40, a conical seating surface for controlling flow of fluid through outlet port 32ª, and a stem portion 41 which extends through the bore portion 7 and into bore portion 6. The stem portion 41 is not, however, guided by either of the bore portions 6 or 7. The spring 37, which has one end abutting the valve member 34 and its other end abutting the valve member 38, is under compression and exerts a force tending to urge both the valve members 34 and 38 against their respective ports to stop flow of fluid into and out of the chamber 32.

The lower end of the bore portion 6 opens into bore portion 42 which in turn opens into bore portion 43, portions 42 and 43 being progressively larger than bore portion 6. The bore portion 43 is internally threaded for receiving an externally threaded portion 44 of the lower cap member 4. A diaphragm 45, which may be of rubber, "neoprene," or any other material from which diaphragms are usually made, is positioned against a shoulder formed at the intersection of the bore portion 42 and 43 and is held in fluid-tight relation by the compressive force exerted due to the screwing of the cap member 4 to the body member 2. If desired, an annular ring member 46 may be positioned between the diaphragm 45 and cap member 4 so that the rotational movement of member 4, when it is being screwed to the body member 2, will not cause the diaphragm 45 to be ruptured. The lower cap member 4 has a recess therein forming a chamber 47 which opens toward the diaphragm 45 and in which is positioned a helical coil spring 48. The spring 48 is held under compression between a pair of abutment members 49, 50. The abutment member 49 is positioned against the diaphragm 45 and the abutment member 50 is held in an adjustably fixed positioned by means of an adjusting screw 51 which is screw-threaded through the lower end wall of the cap member 4 and has a conical end portion projecting into the chamber 47 and into a recess 52 of the abutment member 50. A locking nut 53 may be screw-threaded to the adjusting screw 51 and may be turned tightly against the end wall of the lower cap member 4 to prevent unwanted rotation of the screw 51.

The abutment member 49 is held in fixed position relative to the diaphragm 45 by an abutment member 54 which has a downwardly extending portion 55 of reduced diameter. The portion 55 passes through a central aperture in the diaphragm 45 and also through a central aperture in the abutment member 49. The shoulder, formed at the intersection of the normal diameter portion of member 54 and its reduced diameter portion 55, seats against the diaphragm 45. The members 54 and 49 are clamped tightly, one on each side of the diaphragm, as by peening the portion 55. The upper end wall of the member 54 is recessed to receive and guide the lower end of the stem portion 41 of the outlet valve member 38.

The upper cap member 3 has an upstanding annular flange 56 which is concentric with the bore 13 and the outwardly tapered portion 15 and receives a diaphragm 57 which is preferably made of "neoprene" or like substance. The lower face of the diaphragm 57 seats against an annular shoulder 58 which surrounds the tapered portion 15 and the diaphragm 57 acts to close the open upper end of the bore 13. A closure member 59 has a peripheral portion seating against the upper face of the diaphragm 57 while the central portion of the member 59 is recessed, as at 60, to form a small chamber 61 overlying the diaphragm 57. The peripheral edge portion of the closure member 59 substantially fits the inside of the annular flange 56 and the lower peripheral edge portion of member 59 is cut away to form an annular ring 62 so that when the annular flange 56 is rolled and the closure member 59 is pushed downward tightly against the periphery of diaphragm 57 a portion of the diaphragm is forced into the ring 62 to insure a fluid-tight seal between the diaphragm 57 and each of the members 3 and 59.

The closure member 59 has a central aperture therethrough in which is sealed one end of a capillary tube 63. The tube 63 has its other end sealed to a bulb means 64 and acts to communicatively connect the bulb means 64 to the chamber 61 to form a sealed interconnected system 65. The bulb means 64 contains a compressed expansible-contractible compressed pellet 66 preferably comprising a rubber-like binder carrying a fusible crystalline material and a finely divided metal heat conductor, such for example as is disclosed in the copending application of Sergius Vernet, S. No. 148,658, filed June 17, 1937, for Temperature responsive elements and method of making same, now Patent No. 2,259,846, October 21, 1941. The remainder of the system 65 is filled with distilled water through the filler tube 67 which is then sealed. Upon increase in temperature of the bulb means 64 to a predetermined temperature, the pellet 66 will increase in size, due to the fusion of the crystalline material, and as the system 65 is filled with distilled water, the diaphragm 57 will be moved downwardly into the tapered portion 15 of bore 13 to engage the upper end portion of the valve stem portion 33 and upon continued expansion of the pellet 66 the valve member 34 will be moved to open position to allow flow of fluid from the radially extending passageways 29 through the space between the walls of bore 13 and the reduced diameter portion of the valve stem portion 33. To prevent any particles which might separate themselves from the pellet 66 from entering the capillary tube 63, a fine mesh screen 68 is placed within the bulb means 64 so that any fluid flowing therefrom into the tube 63 must of necessity pass through the screen 68.

As shown in Fig. 2, the bulb means 64 is positioned in heat exchange relation with the outlet conduit 69 of a refrigerating compressor 70 and the inlet port 24 is connected to the water outlet 71 of a water cooled condenser 72. The outlet port 22 is connected by means of a conduit 73 to a sewer or other means of disposing of the condenser waste water.

The operation of the valve means 1 is as follows: Upon starting of the compressor 70, hot refrigerant vapor will be discharged through the outlet conduit 69 into the condenser 72. As the pressure within the conduit 69 and condenser 72 increases, the temperature of the bulb means 64 increases. Substantially at a given predetermined temperature of bulb means 64, the pellet 66 fuses and the diaphragm 57 is forced downward to open the valve member 34 against the force of the spring 37. The valve member 38 will be open and condenser waste water will flow from the inlet port 24, through passageway 27, recess 28, passageways 29, bore 13, inlet port 31, chamber 32, outlet port 32ª into the interior of bore portion 6 and against the diaphragm 45, through an orifice 26, outlet port 22 and conduit 73 to the sewer. The orifice 26 forms a restriction to flow of the waste water and the pressure soon builds up within the bore portion 6 and against the diaphragm 45 to the predetermined pressure at which spring 48 is set to allow the diaphragm 45 to move downward so that the spring 37 can move the valve member 38 to a partially closed position such that the flow through the outlet port 32ª is just sufficient to maintain the pressure within bore portion 6 and against the diaphragm 45 at the said predetermined pressure, which pressure is determined by the setting of the adjustment screw 51. The predetermined pressure is set at a value which is determined by the average temperature of the entering cooling water and the capacity of the compressor 70 so that when the compressor 70 is operating the flow of cooling water is sufficient to maintain the temperature of the condensing refrigerant in the condenser 72 at a safe temperature somewhat below the temperature necessary to cause the bulb means 64 to open the valve member 34 to fluid flow. This is true because the high pressure vapor is discharged in a superheated state from the compressor 70 and is at a temperature substantially above that of the condenser 72. The predetermined temperature, at which the bulb means 64 will open the valve means 1 to flow, is preferably above any expected ambient temperature so that the valve member 34 will not remain in open position due to ambient temperature alone with a consequent waste of condenser water. To decrease the time lag between stopping of the operation of the compressor 70 and closing of the valve member 34 by the bulb means 64, the bulb means 64 may be clamped closely adjacent the outlet 71.

It may now be seen that by means of the proper adjustment of the valve means 1, the flow of the cooling water may be kept at a minimum for economy during compressor operation and may be started and stopped in accordance with the starting and stopping of the compressor 70 so that condenser water flows solely when the condenser 72 requires cooling. The valve means 1, it may also be seen, is a compact, positively operating apparatus which is simple of manufacture and economical to make in production quantities. Because all of the mechanism is housed in one body, it is necessary merely to connect one valve structure into the cooling water line. This decreases the cost of installation and decreases the number of items which must be carried by dealers and repair men.

What is claimed and desired to be secured by Letters Patent of the United States is:

1. In a device of the character described, a casing having a chamber and having a passageway with one end opening externally of said casing and another end opening through one end wall of said chamber, said chamber wall opening forming a valve port, a first valve member positioned within said chamber and cooperable with said port to control flow of fluid therethrough, a transverse partition in said chamber intermediate said chamber end wall and the other end of said chamber and having an aperture therethrough forming a valve port, a second valve member positioned within said chamber intermediate said partition and said chamber end wall and cooperable with said last-named port for controlling flow of fluid therethrough, said casing having a second passageway with one end opening externally of said casing and another end opening into said chamber intermediate said partition and said chamber other end, a spring positioned within said chamber intermediate said partition and said chamber end wall and having one end portion abutting said first valve member and having its other end portion abutting said second valve member and acting to urge said valve members relative to their respective valve ports, temperature responsive means having positive force transmitting connection with said first valve member and acting upon increase in temperature to force said first valve member toward open position, and pressure responsive means acting on said second valve member and acting to maintain substantially constant the pressure of the fluid entering said last-named passageway.

2. In a device of the character described, a casing having a chamber and having a passageway with one end opening externally of said casing and another end opening through one end wall of said chamber, said chamber wall opening forming a valve port, a first valve member positioned within said chamber and cooperate with said port to control flow of fluid therethrough, a transverse partition in said chamber intermediate said chamber end wall and the other end of said chamber and having an aperture therethrough forming a valve port, a second valve member positioned within said chamber intermediate said partition and said chamber end wall and cooperable with said last-named port for controlling flow of fluid therethrough, said casing having a second passageway with one end opening externally of said casing and another end opening into said chamber intermediate said partition and said chamber other end, a spring positioned within said chamber intermediate said partition and said chamber end wall and having one end portion abutting said first valve member and having its other end portion abutting said second valve member and acting to urge said valve members relative to their respective ports, temperature responsive means having positive force transmitting connection with said first valve member and acting upon increase in temperature to force said first valve member toward open position, a restricting flow orifice in said last-named passageway operable to cause a build-up of fluid pressure in said chamber intermediate said partition and said chamber other end, and pressure responsive means acting on said second valve member and acting to maintain substantially constant the pressure of the fluid entering said orifice.

3. In a device of the character described, a casing having a central passageway of normal diameter, a transverse partition in said passageway adjacent to but spaced from one end of said passageway, said partition having a central aperture therethrough forming an outlet port, the other end portion of said passageway being of larger diameter than said normal diameter and screw-threaded, a cap member having a screw-threaded projecting portion for threaded engagement with said passageway threaded portion, said cap member having an aperture therethrough concentric with said passageway, said cap member aperture having a portion of reduced diameter relative to the normal diameter of said passageway and having a portion of equal diameter to that of said passageway, said equal diameter aperture portion opening into said passageway, the opening of said reduced diameter aperture portion into said equal diameter portion forming an inlet port, said casing having an outlet passageway leading from said central passageway intermediate said transverse wall and said central passageway one end, said casing and said cap member having an inlet passageway leading from an external surface of said casing and opening into said reduced diameter aperture portion, a power element having a flexible diaphragm secured to and sealing the end of said cap member aperture opposite said cap member aperture equal diameter portion, a first valve member positioned within said equal diameter aperture portion and cooperable with said inlet port to control the flow of fluid to said central passageway, said valve member having a stem portion extending into and guided in said cap member reduced diameter aperture portion, said diaphragm being operable to engage the end surface of said stem portion so that said valve member is forced to an open position for flow of fluid through said inlet port, a second valve member positioned in said central passageway intermediate said partition and said cap member and cooperable with said outlet port to control flow of fluid therethrough and having a stem portion extending through said partition, pressure sensitive means secured to said casing and sealing said central passageway one end, said pressure sensitive means being engageable with said second valve member stem portion for moving said second valve member relative to said outlet port for controlling flow of fluid therethrough and stressed means positioned within said central passageway and engageable with each of said valve members for urging said valve members relative to their respective ports.

4. In a device of the character described, a casing having a central passageway of normal diameter, a transverse partition in said passageway adjacent to but spaced from one end of said passageway, said partition having a central aperture therethrough forming an outlet port, the other end of said passageway being of larger diameter than said normal diameter and screw-threaded, a cap member having a screw-threaded projecting portion for threaded engagement with said passageway threaded portion, said cap member having an aperture therethrough concentric with said passageway, said cap member aperture having a portion of reduced diameter relative to said passageway normal diameter and having a portion of equal diameter to said passageway normal diameter, said equal diameter aperture portion opening into said passageway, the opening of said reduced diameter aperture portion into said equal diameter portion forming an inlet port, said casing having a shoulder within said passageway intermediate said passageway screw-threads and said partition, an annular packing member seating against said shoulder, said casing having an aperture of greater diameter than said passageway larger diameter and opening through an end wall of said casing adjacent said passageway other end and opening into said passageway other end, a second annular packing member seated against said casing end wall and concentric with said casing aperture, said cap member having adjacent its screw-threaded portion a first seating surface and having a second seating surface, said cap member acting upon being screw-threaded to said casing to compress said first packing member intermediate said casing shoulder and said first seating surface and to compress said second packing member intermediate said casing end wall and said second seating surface, said cap member cooperating with said casing aperture to form an annular chamber intermediate said passageway larger diameter and said casing end wall, inlet means leading to said annular chamber, said cap member having a plurality of passageways leading from said annular chamber to said cap member aperture reduced diameter portion, a first valve member positioned within said cap member aperture equal diameter portion and cooperable with said inlet port to control the flow of fluid therethrough, a second valve member positioned in said casing central passageway intermediate said transverse partition and said cap member and cooperable with said outlet port to control flow of fluid therethrough, means carried by said casing and sealing said passageway one end, said last-named means being operatively connected to said second valve member for moving said second valve member relative to said outlet port for controlling flow of fluid therethrough, and stressed means positioned within said central passageway and engageable with each of said valve members for urging said valve members relative to their respective ports.

5. In a device of the character described, a valve casing having a passageway therethrough including a valve port, a valve member positioned within said passageway and cooperable with said port for controlling flow of fluid therethrough and having a stem portion extending through said port, said casing having an internally threaded annular flange concentric with said passageway and having a pair of spaced seating surfaces concentric with said passageway, said passageway opening at one end into the central open portion of said annular flange, a cup-shaped end member having at its open end a seating surface and having adjacent its open end an externally threaded portion for screw-threaded engagement to said flange, a diaphragm held adjacent its periphery between one of said spaced seating surfaces and said cup-shaped member surface, a plate-like abutment member positioned on the cup-shaped member side of said diaphragm and having a diameter greater than the diameter of the other of said spaced seating surfaces, an abutment member positioned against said diaphragm on the side of said diaphragm adjacent said port, said last-named member having a recess facing said port, said recess having a tapered portion leading to a cylindrical guide portion, said tapered portion having its greater diameter portion facing said port and being of greater diameter than the diameter of said port, said valve member stem portion being received within said recess and guided by said tapered portion into said cylindrical portion for engagement with the bottom wall of said recess, said diaphragm and said first-named abutment member having aligned central apertures therethrough, said last-named abutment member having an extending portion extending through said aligned central apertures, means securing together said abutment members and said diaphragm, means positioned within said passageway for urging said valve member relative to said port, and means positioned within said cup-shaped end member and acting through said abutment members for urging said valve member relative to said port, the movement of said diaphragm toward said port being limited by engagement of said diaphragm with said other seating surface.

6. A regulating valve for controlling flow by temperature and by fluid back pressure, comprising a hollow open-ended casing, a partition in said casing and dividing said casing internally into a valve chamber and an outlet chamber, said partition having a port therethrough for flow from said valve chamber to said outlet chamber, a closure member for the open end of said valve chamber and having an inlet port aligned with said partition port, oppositely directed conical inlet and outlet valve members in said valve chamber and cooperable with said ports, guide means on each of said valve members and cooperable with the wall of said valve chamber, a coil spring in said valve chamber and having its opposite ends engaging said guide means to urge said valve members in opposite directions and toward closed position, temperature responsive means carried by said closure member and operable to move said inlet valve member toward open position, pressure responsive means closing the open end of said outlet chamber, and a valve stem extending through said partition port and operatively connecting said outlet valve member and said pressure responsive means.

7. A regulating valve for controlling flow by temperature and by fluid back pressure, comprising a hollow internally cylindrical open-ended casing, a partition in said casing and dividing said casing internally into a valve chamber and an outlet chamber, said partition having a port therethrough for flow from said valve chamber to said outlet chamber, a closure member for the open end of said valve chamber and having an inlet port aligned with said partition port, a hollow cylindrical extension on said closure member within said casing and forming an end portion of said valve chamber, oppositely directed conical inlet and outlet valve members in said valve chamber and cooperable with said ports, guide means on each of said valve members and cooperable with the wall of said valve chamber, the guide means on said inlet valve member being positioned within said extension, a coil spring in said valve chamber and having its opposite ends engaging and urging said valve members in opposite directions and toward closed position, temperature responsive means carried by said closure member and operable to move said inlet valve member toward open position, pressure responsive means closing the open end of said outlet chamber, and a valve stem extending through said partition port and operatively connecting said outlet valve member and said pressure responsive means.

8. In a regulating valve including a casing having a conduit therethrough, a closure member for one end of said casing, a hollow internally cylindrical extension on said member and positioned within said casing, said closure member having a passageway therethrough concentric with said extension and forming a part of said conduit, a valve member within said extension and controlling discharge from said passageway, a stem on said valve member and extending into said passageway, guide means on said stem and fitting said passageway, a thermally actuated diaphragm closing the outer end of said passageway and engageable with said guide means to actuate said valve member, and a guide member on said valve member and fitting within said extension.

EARNEST J. DILLMAN.